(12) United States Patent
Edlingger et al.

(10) Patent No.: US 6,879,450 B2
(45) Date of Patent: Apr. 12, 2005

(54) INTERFERENCE COLORED FILTERS

(75) Inventors: Johannes Edlingger, Frastanz (AT);
Reinhard Sperger, Feldkirch (AT);
Maria Simotti, Wangs (CH)

(73) Assignee: Unaxis Trading AG, Trubbach (CH)

( * ) Notice: Subject to any disclaimer, the term of this patent is extended or adjusted under 35 U.S.C. 154(b) by 137 days.

(21) Appl. No.: 10/205,088

(22) Filed: Jul. 25, 2002

(65) Prior Publication Data

US 2002/0196568 A1 Dec. 26, 2002

Related U.S. Application Data

(62) Division of application No. 09/641,486, filed on Aug. 18, 2000, now Pat. No. 6,468,703, which is a continuation of application No. PCT/CH99/00026, filed on Jan. 21, 1999.

(30) Foreign Application Priority Data

Feb. 20, 1998 (CH) .............................................. 417/98

(51) Int. Cl.[7] .............................................. G02B 5/22
(52) U.S. Cl. ...................................... 359/891; 349/108
(58) Field of Search .......................... 359/891; 349/106, 349/108, 109, 107; 430/7

(56) References Cited

U.S. PATENT DOCUMENTS

| 4,029,394 | A | | 6/1977 | Araki |
| 4,313,648 | A | | 2/1982 | Yano et al. |
| 5,246,803 | A | | 9/1993 | Hanrahan et al. |
| 5,689,318 | A | | 11/1997 | Matsuyama et al. |
| 6,154,265 | A | * | 11/2000 | Kamio et al. ............... 349/122 |
| 6,342,970 | B1 | * | 1/2002 | Sperger et al. ............. 359/587 |

* cited by examiner

*Primary Examiner*—Leo Boutsikaris
(74) *Attorney, Agent, or Firm*—Notaro&Michalos PC

(57) ABSTRACT

A pattern structure has at least two different color filter elements disposed one beside the other on a carrier substrate. Each element includes a layer of dielectric material, the layer of dielectric material residing at at least one of the filter elements on a layer of a material that is resistant to activated oxygen or activated water. The layer of resistant material has a second surface pointing toward the substrate and is made of silicon or silicon dioxide.

68 Claims, 2 Drawing Sheets

INTERFERENCE COLORED FILTERS

CROSS-REFERENCE TO RELATED APPLICATIONS

This is a divisional of U.S. patent application Ser. No. 09/641,486 filed Aug. 18, 2000 and now U.S. Pat. No. 6,468,703, which was a continuation of international application PCT/CH99/00026 filed Jan. 21, 1999, which claims priority on Swiss application 417/98 filed Feb. 20, 1998.

FIELD AND BACKGROUND OF THE INVENTION

The present invention relates to a structure on a substrate, in which a structured lacquer layer with lacquer layer surface regions and lacquer-free regions is deposited in lift-off technique, subsequently a color filter layer system is deposited and, lastly, with the lacquer layer surface regions the regions deposited thereon of the color filter layer system are removed.

Such a technique is known as lift-off technique. It is relatively cost-efficient since therein relatively few process steps have to be carried out in a vacuum atmosphere. This technique is known, for example, from U.S. Pat. No. 3,914,464.

As a lift-off mask a photosensitive lacquer or a metal layer with given thickness of, for example, 4 to 6 $\mu$m is deposited and thereover is deposited a dielectric interference color filter layer system of only one half the thickness. The lift-off lacquer is cured over a long period of time, more than 8 hours at 200° C. in a vacuum atmosphere, before the color filter layer system is precipitated above it. In the lift-off step proper the lift-off lacquer or its structured areas are removed with hot xylene after precipitation of the color filter layer system.

It is evident that the lift-off lacquer layer structure is treated at high expenditures and specifically such that vapor deposition can even be used as the precipitation process for the color filter layer system. In order to ensure satisfactory quality of the precipitated system layers, a vapor deposition temperature of more than 200° C. must be maintained. The subjacent lacquer layer must, in any event, be able to tolerate these temperature without undergoing any changes.

Furthermore, it is known from the literature, for example H. A. MACLEOD, "Thin-Film Optical Filters", Second Edition, Adam Hilger Ltd., 1986, pp. 357 to 405, that optical layers vapor-deposited at lower temperatures are spectrally unstable. Their spectral properties vary with ambient temperature and humidity, with the cut-on and cut-off edges of the spectral characteristics, in particular, being shifted. If the intent is to precipitate spectrally stable layers with satisfactory quality, the vapor-deposition temperature must be very high which leads to the fact that the subjacent lacquer is polymerized and the subsequent lift-off process is made extremely difficult. On the other hand, if it is attempted to keep the temperature of the vapor-deposition process low, this, as described, is obtained at the expense of strong spectral shifts of said edges, which shifts are a function of the temperature and air humidity.

The long heating of the lacquer in vacuo, proposed in the above cited publication, is, in addition, extremely expensive and reduces significantly the production rate of production installations for such structures. The use of hot xylene for dissolving the lacquer resistant to temperatures, which, by necessity, are relatively high, furthermore is highly questionable in view of the carcinogeneity of xylene. Since, moreover, due to the method of applying the color filter layer system at temperatures far above 200° C., a lacquer layer resistant to these temperatures must be provided, large attack areas for the solvent must be made available for the subsequent removal of the lacquer. Therefore, the lacquer layer thickness must be significantly greater than the thickness of the color filter layer system to be deposited thereon. This results in large disturbed zones; if, following the lacquer application and the structuring of the lacquer layer, a color filter subsystem is deposited in the lacquer regions and those free of lacquer, then, as depicted in FIG. 1, due to the shadowing by the edges of the lacquer regions 1, disturbance zones result in the margin regions 3 of the color filter structure, in which the thickness of the color filter structure is less than in the undisturbed regions 5. The greater the lacquer thickness d, the greater are the regions of the disturbed color filter structure.

It is, in addition, known that substrate glasses shrink, i.e. change their form, at the temperatures necessary for the vapor deposition of said color filter layer systems. This leads to the fact that the precipitation of color filter layer systems taking place side by side, with differing spectra, such as, for example, for red, yellow and blue, cannot take place with geometric precision which leads to lack of sharpness between filter regions of differing spectral regions.

The glass substrate, furthermore, becomes brittle at said high temperatures, in particular taking into account the alternating thermal stress, for example during the sequential precipitation of several color filter layer systems in lift-off technique. This leads to degradation of the stability against fracture of the manufactured structures and therewith also to an increase of disturbed structures.

It would be a further alternative to use a lacquer which endures the requisite high vapor deposition temperatures, thus temperatures in the range of 300° C. However, such lacquers are expensive and difficult to process further.

Further, lift-off masks of metal, for example comprising Al or Cr, could be used. Since their application, however, conventionally requires again a vacuum coating step, this would also be too expensive.

SUMMARY OF THE INVENTION

Building on a process of the above cited type, it is the task of the invention to remedy said disadvantages. This is attained when carrying out said process according to the invention.

It becomes thereby possible to stress thermally the lift-off lacquer to a significantly lesser degree during the precipitation of the filter layer systems, that is, far below the polymerization temperature of, for example, conventional photosensitive lacquers. Through the proposed plasma-enhanced precipitation process, in which the substrate is exposed to high ion bombardment density, preferably through plasma-enhanced vapor deposition or through sputtering, furthermore filters with dense layers and spectral properties are generated which are temperature and humidity stable. Since the lacquer is thermally significantly less stressed, its necessary thermal resistance can be decisively reduced which, in turn, leads to the fact that a significantly shorter lacquer treatment and significantly reduced lacquer layer thicknesses are required which, in turn, reduces the extension of the disturbed regions 3 according to FIG. 1. Moreover, conventional photosensitive lacquers can be used and can be dissolved by means of customary solvents, such as by means of acetone or NMP (N-methyl-2-pyrrolidone) for the lift-off.

The process according to the present invention:

Consequently results in significantly reduced coating temperatures which leads to the reduction of the necessary lacquer thickness and to the fact that conventional cost-effective lacquers can be used. The further resulting lacquer thickness reduction leads directly to the reduction of the extension of the disturbed regions according to FIG. 1.

Due to the plasma enhancement of the coating, be that by generation of charged particles in a separate plasma chamber, extraction through grids into the coating volume or by plasma generation in the coating volume, a bombardment of the substrates with an ion current of high density is realized, with which dense, optically stable filter layers are realized.

The extension of the disturbed loci effected by shadowing can be reduced through additional directing measures, such as provision of collimators or through electrostatic orientation of the ion movement. In addition, low minimum pressures are used in the coating chamber, with correspondingly large mean free path length.

If, without providing additional directing measures, sputtering is used, according to FIG. 1, disturbed regions 3 with an extension of approximately 5* d are obtained, with more directed plasma-enhanced processes down to approximately 1* d. This results even with the values for d (the laquer layer thickness) which, according to the invention, are low per se.

A more directed coating process than sputtering is the plasma-enhanced vapor deposition in which, as is known, a material is thermally vaporized from a vaporization crucible into the process atmosphere, for example by electron beam vaporization, wherein a plasma is maintained in the atmosphere. Therewith the problem of the shadowing is further remedied, and it becomes also possible to precipitate color filter layer system structures with very small extension under control and with high efficiency.

The proposed process is especially suitable for the color filter structuring for LCD projectors and CCD sensors.

BRIEF DESCRIPTION OF THE DRAWINGS

In the following the invention will be explained by example in conjunction with drawings wherein.

DESCRIPTION OF THE PREFERRED EMBODIMENT

Figure 2:
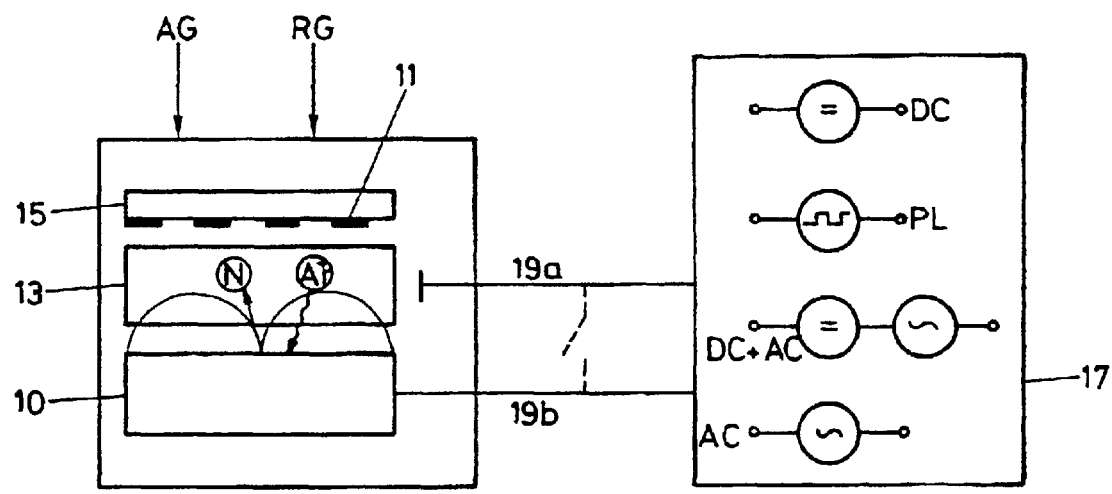
FIG. 2 schematically illustrates a sputter coating installation in schematic form suitable for carrying out the process according to the invention.

FIG. 2 schematically depicts a first embodiment of an installation for sputtering used according to the invention.

Above a sputter source 10 with the target material to be sputtered off, such as, for example, a magnetron source, a plasma 13 is maintained. Ions of a supplied working gas AG, such as, for example, Ar, by pulse transmission knock largely neutral target material particles N out of the target, which become deposited onto a workpiece 15. As shown schematically at the feed unit 17, the plasma above the sputter source can be operated with DC or by means of a pulsed DC voltage PL or, in principle, by means of superimposed DC and AC or with AC, in particular RF power. Due to the precipitation of interest in the present case, of dielectric layers on customarily non-conducting workpiece substrates 15, the feasibility is in particular pointed out of operating the plasma by means of a DC voltage, however, to connect low-ohmically the plasma-generating electrodes, as shown schematically in FIG. 2 at 19a and 19b and as indicated thereon in dashed lines, at given time intervals, preferably periodically. With respect to the plasma-enhanced coating of non-conducting substrates with dielectric layers and using DC plasmas or of substrate bias, reference can be made to:

EP 508 359 or U.S. Pat. No. 5,423,970; and EP 564 789 or U.S. Pat. Nos. 5,948,224 and 6,149,783.

The layers of the color filter layer systems are each generated either nonreactively, thus exclusively using the working gas AG and/or by a reactive sputtering process and use of a reactive gas RG, such as of $O_2$, for example depending on which layer materials are used. Therein, according to the invention, temperatures of the coated workpieces 15, provided with the lift-off lacquer 11, of maximally 150° C., preferably maximally 100° C., are maintained.

Due to the high ion bombardment density, dense layers are realized which hardly change their spectral properties at varying ambient temperature and humidity.

Figure 1:
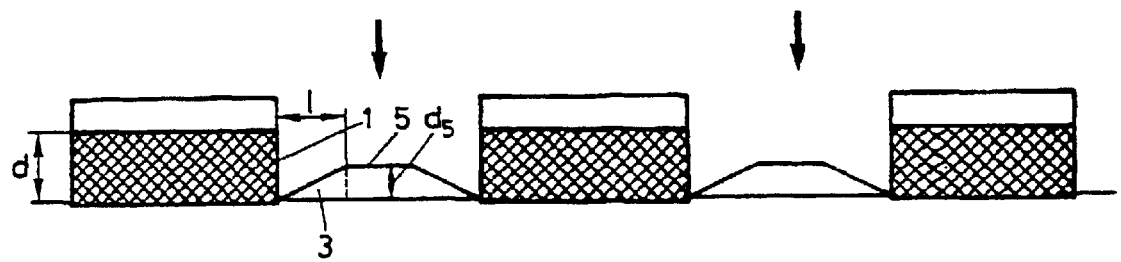
FIG. 1 is a schematic depiction of a lacquered, structured, and coated substrate to explain the development of disturbed regions.

Without further directing measures, such as providing collimators, the sputter coating according to the invention is suitable for application in which disturbed regions 3 according to FIG. 1 having an extension of approximately 5* d can be accepted. Stated in terms of the maximum disturbed region thickness $d_s$ each disturbed region 3 has a width of at most 10* d, since, as will be explained later, the necessary lift-off lacquer layers of thickness d can be substantially thinner than twofold the color filter layer systems deposited thereon.

Figure 3:
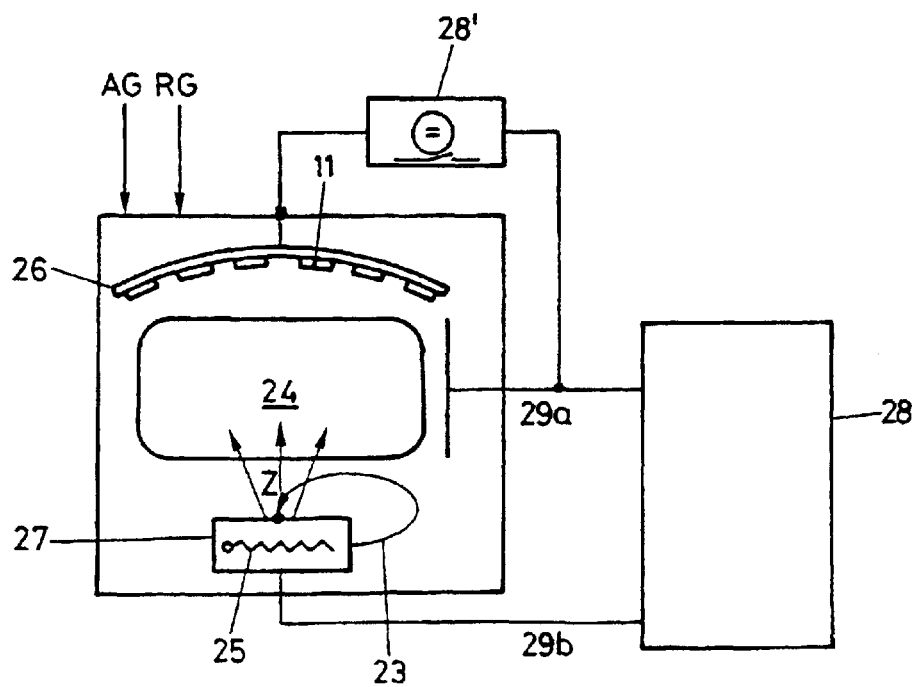
FIG. 3 illustrates an installation suitable for carrying out the process according to the invention for the plasma-enhanced thermal vapor deposition, again shown schematically.

In FIG. 3, in a representation analogous to FIG. 1, a second process used according to the invention is shown schematically, namely plasma-enhanced or ion-enhanced vapor deposition. Herein, for example by means of an electron beam 23 and/or a heating unit 25, a material is vaporized from a crucible 27. Again, a dense plasma 24 is maintained above the crucible 27 with a feed source 28 which, with respect to the output signals, can be structured analogous to the source 17 explained in conjunction with FIG. 2. The workpieces are here preferably disposed on a rotationally driven carrier 26 shaped like a calotte whose sphere center is the center Z of the vaporization source 27. Again, temperatures are maintained not exceeding 150° C., in particular not exceeding 100° C. This directed process makes it possible to coat lift-off lacquer structures 11 with filter layer systems, which require disturbed regions 3 according to FIG. 1 whose extension is approximately 1*d and less.

Figure 4:
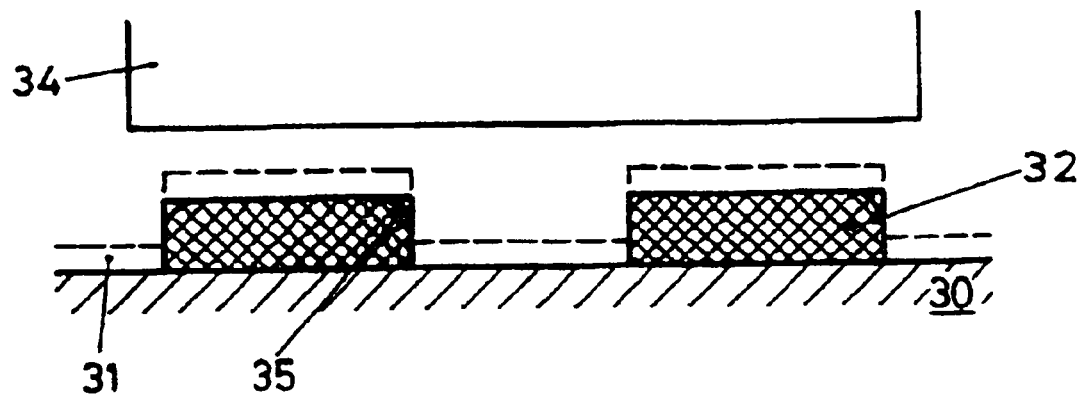
FIG. 4 schematically illustrates a lacquer structure deposited on a substrate and its rounding-up of the succeeding coating.

In plasma-enhanced or ion-enhanced vapor deposition, according to FIG. 3, depending on the layer to be built up of the color filter layer system, work also proceeds nonreactively with the exclusive use of working gas AG or reactively using a reactive gas RG. In FIG. 4 is shown on an enlarged scale the lift-off lacquer structure 32 on the substrate 30. Above it is shown schematically the plasma 34 of the plasma-enhanced precipitation process. If the first layer 31 of the color filter layer system, shown in dashed lines in FIG. 4, is to be deposited by a reactive process, such as in particular using ionized oxygen, the lift-off lacquer structure, as shown schematically at 35, in particular in the edge regions is attacked by excited reactive gas, as stated, in particular $O_2$ or by $H_2O$ activated in the plasma and/or split from the residual gas.

A first feasibility of preventing this comprises depositing the first layer of the color filter layer system nonreactively, thus in view of FIG. 2 or FIG. 3 with the exclusive use of the working gas Ar. For this purpose the layer material is used either directly as target or vaporization source material.

Figure 5:
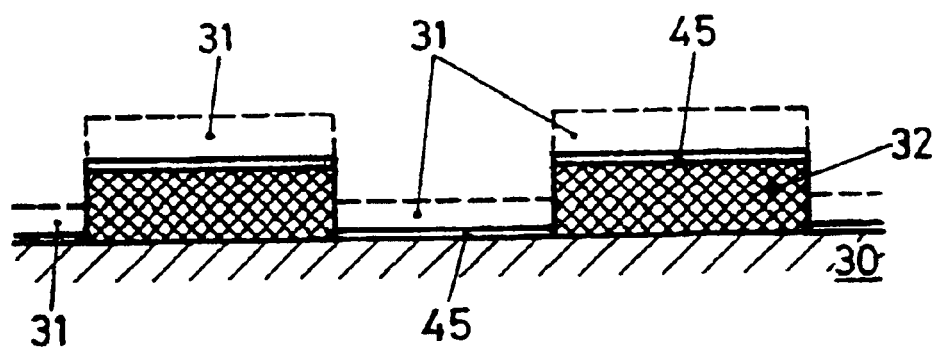
FIG. 5 is a representation analogous to FIG. 4, the provision of an intermediate layer between lacquer structures and subsequently precipitated filter layer to avoid the rounding-up of the edges explained in conjunction with FIG. 4, of the photosensitive lacquer.

A second and preferred feasibility comprises according to FIG. 5 applying before application of the first layer 31 of the color filter layer system, an optically broadband and largely transmitting free of loss, i.e. optically neutral, well-adhering intermediate layer onto the lift-off lacquer structure, which as a protective layer withstands the subsequent process. The intermediate layer 45 shown in FIG. 5 having a thickness of 5 to 10 nm, comprises preferably SiO or $SiO_2$, which is chemically not attacked by excited ionized reactive gas, in particular $O_2$ or $H_2O$ from the residual gas. In FIG. 5 the layer 31 drawn in dashed lines denotes the subsequently applied first optically active layer of the color filter layer system which can now be deposited through a reactive process. Subsequently, the intermediate layer 45 can also comprise $SiO_2$ which is precipitated nonreactively or only weakly reactively. In this case, an $SiO_2$ intermediate layer forms the first, low-refractive layer of the filter layer system with following higher-refractive layers.

In the following, coating processes used by example with the resulting color filter structures will be introduced.

EXAMPLE 1

| | |
|---|---|
| Substrate: | Glass |
| Filter structure: | Strips 160 µm wide |
| | 20 mm long, 100 µm spacing |
| Lacquer layer thickness: | 3.2 µm |
| Lacquer: | Shipley 1045, diluted 6:1 |
| Optical filter layer system: | 1.5 µm ($d_5$ of FIG. 1) |
| Layer system: | $SiO_2/TiO_2$ |
| Coating process $SiO_2$: | Reactive sputtering, |
| | Installation BAS 767 |
| Source: | Si Target |
| Sputter power: | 6.4 kW |
| Working gas: | Ar |
| Reactive gas: | $O_2$ |
| Working gas flow: | 40 sccm |
| Reactive gas flow: | 50 sccm |
| Rate: | 0.3 nm/sec |
| Coating process $TiO_2$: | Reactive Sputtering |
| Source: | Ti Target |
| Sputter power: | 10 kW |
| Working gas: | Ar |
| Reactive gas: | $O_2$ |
| Working gas flow: | 40 sccm |
| Reactive gas flow: | 36 sccm |
| Rate: | 0.16 nm/sec |
| Coating temperature: | T ≦ 80° C. |
| Results: | |
| Size of the disturbed zone next to the lacquer mask (1 of FIG. 1): | ≦ 10 µm |
| stability of the edges of the filter: | ≦ 1 nm edge shift from 20° C. to 80° C. |

In this example the intermediate layer has been omitted. The plasma is switched on before the coating proper is started. Therefore the lacquer mask comes into contact with $O_2$/Ar plasma. The edges of the lacquer are thereby rounded. This makes the lift-off step difficult or necessitates a relatively thick lacquer mask.

EXAMPLE 2

| | |
|---|---|
| Substrate | Glass |
| Filter structure: | Strips 10 × 10 µm to 100 × 100 µm |
| Lacquer layer thickness (d): | 0.5 µm–2 µm |
| optical filter layer ($d_5$): | 1.4 µm |
| Lacquer: | Shipley 1045, Dilution 6:1 to 1:1 |
| Layer system: | Intermediate layer SiO, 10 nm thick, $SiO_2/TiO_2$ |
| Coating process: | SiO intermediate layer nonreactive without plasma enhancement, $SiO_2/TiO_2$ system plasma-enhanced vapor deposition, Installation LEYBOLD APS 1100 |
| SiO nonreactive, without APS plasma source: | |
| Source: | E-beam vaporizer with four-hole crucible, SiO granulate |
| Rate: | 0.1 nm/sec |
| Installation: | BAS 767 |
| Pressure: | $1 * 10^{-5}$ mbar |
| $SiO_2$: | Reactive vapor deposition with APS plasma source |
| Source: | E-beam vaporizer with four-hole crucible, $SiO_2$ granulate |
| Rate: | 0.6 m/sec |
| APS plasma source: | |
| Discharge current: | 50 A |
| Bias voltage: | 150 V |
| U anode cathode: | 130 V |
| Working gas: | Ar |
| Reactive gas: | $O_2$ |
| Working gas flow: | 15 sccm |
| Reactive gas flow: | 10 sccm |
| Total pressure: | $3.5 * 10^{-3}$ mbar |
| $TiO_2$: | Reactive vapor deposition with APS plasma source |
| Source: | E-beam vaporizer with four-hole crucible, TiO tablets |
| Rate: | 0.3 m/sec |
| APS plasma source: | |
| Discharge current: | 50 A |
| Bias voltage: | 110–120 V |
| U anode cathode: | 100–110 V |
| Working gas: | Ar |
| Reactive gas: | $O_2$ |
| Working gas flow: | 11 sccm |
| Reactive gas flow: | 35 sccm |
| Total pressure: | $4.2 * 10^{-3}$ mbar |
| Coating temperature: | T ≦ 105° C. |
| Results: | |
| Stability | <1 nm spectral edge shift from 20° C. to 80° C. |
| Size (1) of the disturbed zone: | <2 µm |

Through the process according to the invention it becomes possible to produce pixel structures, such as in particular for LCD light valve projectors and CCD sensors, cost-effectively and with low part rejects rate which, in addition, are spectrally extremely stable against environmental changes, in particular temperature and humidity changes. In particular, when using said intermediate layer, moreover, extremely good adhesion of the color filter system on the substrate is attained. The necessary lift-off lacquer layers can be substantially thinner than the twofold of the color filter layer systems deposited thereon. Providing overhanging side walls of the lacquer regions, as is customary in aluminization in the semiconductor production, is superfluous.

Since the application of the color filter layer systems takes place at low temperatures and consequently the subjacent lift-off lacquer structures are exposed to correspondingly low temperature stresses—thus need only have low temperature resistance—an extremely simplified lift-off technique results without hot and extremely aggressive solvents or ultrasound needing to be employed for the lift-off.

The preferred use of said intermediate layer avoids negatively influencing the reactive precipitations of the first filter layer on the lift-off lacquer, in particular the edge damage of the lacquer structures through reactive $Ar-O_2-H_2O$ plasmas.

What is claimed is:

1. A pattern structure of at least two different color filter elements disposed one beside the other upon a carrier substrate, said filter elements each comprising a layer of dielectric material, said layer of dielectric material residing at at least one of said filter elements upon a layer of material that is resistant to activated oxygen or activated water and having a second surface facing towards the said substrate, wherein said dielectric layers of said filter elements are laterally disposed side-by-side and form a disturbed region between adjacent said filter elements, said dielectric layers having a thickness of at most $d_6$ and wherein said disturbed region has a width of at most $10 * d_5$.

2. The structure of claim 1, wherein said resistant material is silicon or silicon dioxide.

3. The structure of claim 1, wherein said second surface of said layer of resistant material facing toward said substrate resides upon the surface of said substrate.

4. The structure of claim 1, wherein said width is at most $2 * d_5$.

5. The structure of claim 1, wherein said layer of resistant material has a thickness of between 5 and 10 nm.

6. The structure of claim 1, wherein said at least one filter element has a spectral edge shift that is at most 1 nm over a temperature range of 20 to 80° C.

7. The structure of claim 1, wherein said thickness is at most 10 μm.

8. The structure of claim 7, wherein said thickness is at most 2 μm.

9. An LCD light valve arrangement with a pattern structure according to claim 1.

10. An LCD light valve arrangement with a pattern structure according to claim 2.

11. An LCD light valve arrangement with a pattern structure according to 3.

12. An LCD light valve arrangement with a pattern structure according to claim 4.

13. An LCD light valve arrangement with a pattern structure according to claim 5.

14. An LCD light valve arrangement with a pattern structure according to claim 6.

15. An LCD light valve arrangement with a pattern structure according to claim 7.

16. An LCD light valve arrangement with a pattern structure according claim 8.

17. A CCD sensor arrangement with a pattern structure according to claim 1.

18. A CCD sensor arrangement with a pattern structure according to claim 2.

19. A CCD sensor arrangement with a pattern structure according to claim 3.

20. A CCD sensor arrangement with a pattern structure according to claim 4.

21. A CCD sensor arrangement with a pattern structure according to claim 5.

22. A CCD sensor arrangement with a pattern structure according to claim 6.

23. A CCD sensor arrangement with a pattern structure according to claim 7.

24. A CCD sensor arrangement with a pattern structure according to claim 8.

25. A pattern structure of at least two different color filter elements disposed one beside the other upon a carrier substrate, said filter elements each comprising a layer of dielectric material, said layer of dielectric material residing at at least one of said filter elements upon a layer of material that is resistant to activated oxygen or activated water and having a second surface facing towards the said substrate, wherein said layer of resistant material has a thickness of between 5 and 10 nm.

26. The structure of claim 25, wherein said resistant material is silicon or silicon dioxide.

27. The structure of claim 25, wherein said second surface of said layer of resistant material facing toward said substrate resides upon the surface of said substrate.

28. The structure or claim 25, wherein said dielectric layers of said filter elements are laterally disposed side-by-side and form a disturbed region between adjacent said filter elements, said dielectric layers having a thickness of at most $d_5$ and wherein said disturbed region has a width of at most $10\ d_5$.

29. The structure of claim 28, wherein said width is at most $2 * d_5$.

30. The structure of claim 28, wherein said thickness is at most 10 μm.

31. The structure of claim 30, wherein said thickness is at most 2 μm.

32. The structure of claim wherein said at least one filter element has a spectral edge shift that is at most 1 nm over a temperature range of 20 to 80° C.

33. An LCD light valve arrangement with a pattern structure according to claim 25.

34. An LCD light valve arrangement with a pattern structure according to claim 26.

35. An LCD light valve arrangement with a pattern structure according to claim 27.

36. An LCD light valve arrangement with a pattern structure according to claim 28.

37. An LCD light valve arrangement with a pattern structure according to claim 29.

38. An LCD light valve arrangement with a pattern structure according to claim 30.

39. An LCD light valve arrangement with a pattern structure according to claim 31.

40. A CCD sensor arrangement with a pattern structure according to claim 25.

41. A CCD sensor arrangement with a pattern structure according to claim 26.

42. A CCD sensor arrangement with a pattern structure according to claim 27.

43. A CCD sensor arrangement with a pattern structure according to claim 28.

44. A CCD sensor arrangement with a pattern structure according to claim 29.

45. A CCD sensor arrangement with a pattern structure according to claim 30.

46. A CCD sensor arrangement with a pattern structure according to claim 31.

47. A pattern structure of at least two different color filter elements disposed one beside the other upon a carrier substrate, said filter elements each comprising a layer of dielectric material, said layer of dielectric material residing at at least one of said filter elements upon a layer of material that is resistant to activated oxygen or activated water and having a second surface facing towards the said substrate, wherein said at least one filter element has a spectral edge shift that is at most 1 nm over a temperature range of 20 to 80° C.

48. The structure of claim 47, wherein said resistant material is silicon or silicon dioxide.

49. The structure of claim 47, wherein said second surface of said layer of resistant material facing toward said substrate resides upon the surface of said substrate.

50. The structure or claim 47, wherein said dielectric layers of said filter elements are laterally disposed side-by-side and form a disturbed region between adjacent said filter elements, said dielectric layers having a thickness of at most $d_5$ and wherein said disturbed region has a width of at most $10 * d_5$.

51. The structure of claim 50, wherein said width is at most $2 * d_5$.

52. The structure of claim 50, wherein said thickness is at most 10 $\mu$m.

53. The structure of claim 52, wherein said thickness is at most 2 $\mu$m.

54. The structure of claim 47, wherein said layer of resistant material has a thickness of between 5 and 10 nm.

55. An LCD light valve arrangement with a pattern structure according to claim 47.

56. An LCD light valve arrangement with a pattern structure according to claim 48.

57. An LCD light valve arrangement with a pattern structure according to claim 49.

58. An LCD light valve arrangement with a pattern structure according to claim 50.

59. An LCD light valve arrangement with a pattern structure according to claim 51.

60. An LCD light valve arrangement with a pattern structure according to claim 52.

61. An LCD light valve arrangement with a pattern structure according to claim 53.

62. A CCD sensor arrangement with a pattern structure according to claim 47.

63. A CCD sensor arrangement with a pattern structure according to claim 48.

64. A CCD sensor arrangement with a pattern structure according to claim 49.

65. A CCD sensor arrangement with a pattern structure according to claim 50.

66. A CCD sensor arrangement with a pattern structure according to claim 51.

67. A CCD sensor arrangement with a pattern structure according to claim 52.

68. A CCD sensor arrangement with a pattern structure according to claim 53.

* * * * *

UNITED STATES PATENT AND TRADEMARK OFFICE
CERTIFICATE OF CORRECTION

PATENT NO. : 6,879,450 B2
DATED : April 12, 2005
INVENTOR(S) : Johannes Edlinger et al.

It is certified that error appears in the above-identified patent and that said Letters Patent is hereby corrected as shown below:

Title page,
Item [75], Inventors, "Johannes Edlingger", should read -- Johannes Edlinger --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,879,450 B2
DATED : April 12, 2005
INVENTOR(S) : Johannes Edlinger et al.

It is certified that error appears in the above-identified patent and that said Letters Patent is hereby corrected as shown below:

Column 7,
Line 34, change "$d_6$" to -- $d_5$ --.

Signed and Sealed this

Eighteenth Day of April, 2006

JON W. DUDAS
*Director of the United States Patent and Trademark Office*